May 14, 1957        R. B. IMMEL        2,792,536
ELECTRO-MAGNETIC SOLENOIDS AND ACTUATORS
Filed Oct. 30, 1953        3 Sheets-Sheet 1
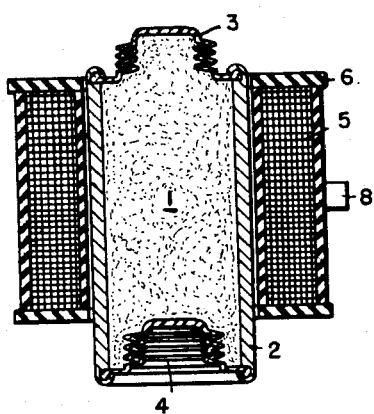
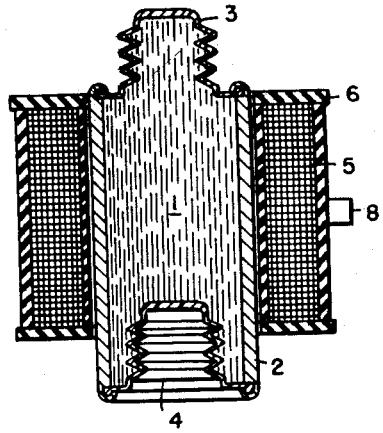
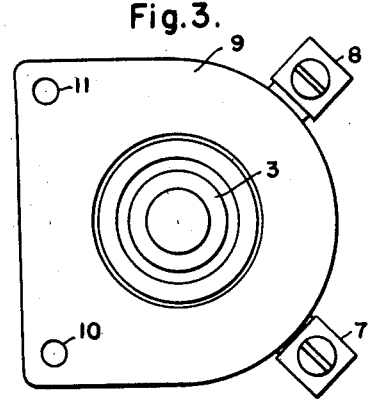
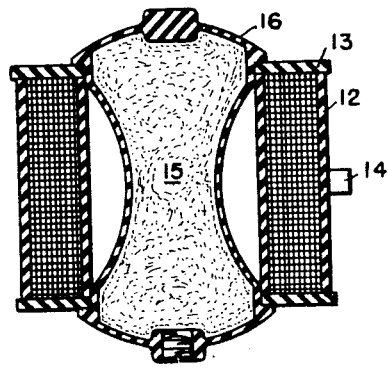
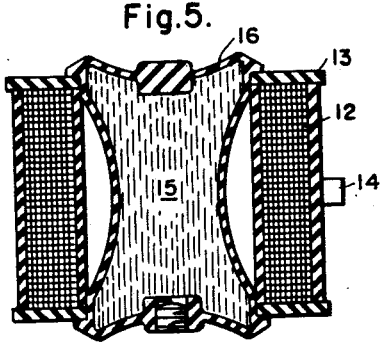
WITNESSES:
INVENTOR
Ralph B. Immel.
BY
ATTORNEY May 14, 1957 R. B. IMMEL 2,792,536
ELECTRO-MAGNETIC SOLENOIDS AND ACTUATORS
Filed Oct. 30, 1953 3 Sheets-Sheet 2

WITNESSES:
E. A. Milloky
Leon M. Garman

INVENTOR
Ralph B. Immel.
BY
Paul E. Friedemann
ATTORNEY

May 14, 1957 R. B. IMMEL 2,792,536
ELECTRO-MAGNETIC SOLENOIDS AND ACTUATORS
Filed Oct. 30, 1953 3 Sheets-Sheet 3
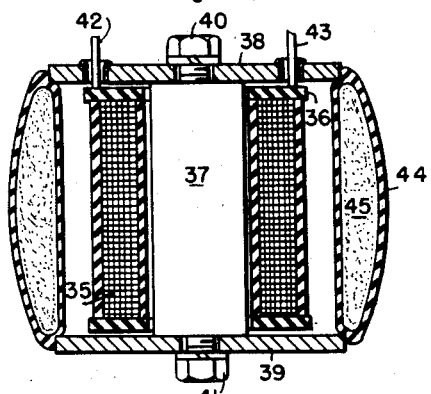
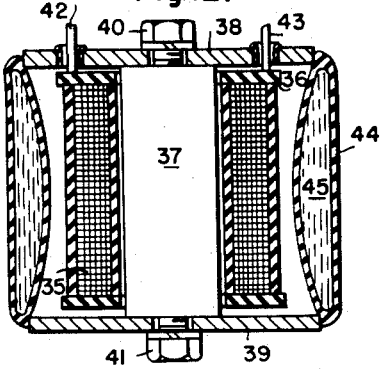
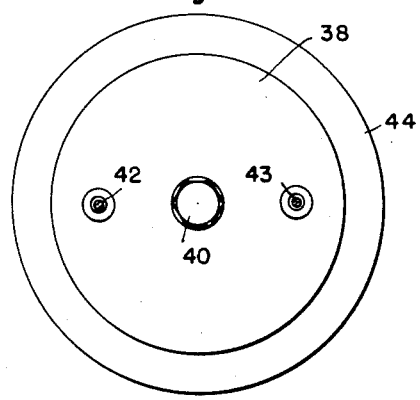
WITNESSES:
INVENTOR
Ralph B. Immel.
BY
ATTORNEY

United States Patent Office 2,792,536
Patented May 14, 1957

---

2,792,536

ELECTRO-MAGNETIC SOLENOIDS AND ACTUATORS

Ralph B. Immel, Williamsville, N. Y., assignor to Westinghouse Electric Corporation, East Pittsburgh, Pa., a corporation of Pennsylvania Application October 30, 1953, Serial No. 389,385

11 Claims. (Cl. 317—198)

This invention relates to electro-magnetic solenoids and actuators and more particularly solenoids and actuators which utilize fluid magnetic substances.

Conventional solenoids generally require very good guiding means for insuring that the plungers and moving members move freely and with a minimum of friction. These parts must be precision formed and are usually made from relatively expensive materials. Most magnetic assemblies also require considerable machining which results in a relatively high-cost product. In addition, industrial atmospheres often contain moisture, corrosive gases, or dust which interfere with the operation of the solenoid in that the dust readily abraids or jams the moving parts and the moisture and corrosive gases tend to corrode them.

Accordingly, one object of this invention is to provide an electro-magnetic solenoid or actuator which utilizes a fluid magnetic substance.

Another object of this invention is to provide a solenoid or actuator which depends for operation upon the change of mass displacement of a fluid magnetic substance when subjected to a magnetic field.

A more specific object of this invention is to provide a solenoid or actuator which utilizes the change of shape of a fluid magnetic substance confined in a flexible enclosure when subjected to a magnetic field.

A further object of this invention is to provide a solenoid or actuator of the character referred to, the life and action of which is substantially unaffected by dusty, corrosive, or moisture laden atmosphere.

The objects stated are merely illustrative. These and other objects will become more apparent from a study of the following specification and accompanying drawings, in which:

Figure 1 shows a cross-sectional view of one embodiment of the invention with the solenoid in its deenergized condition;

Fig. 2 shows a cross-sectional view of the solenoid of Fig. 1 in its energized condition;

Fig. 3 shows a top view of the solenoid of Figs. 1 and 2;

Fig. 4 shows a cross-sectional view of the second embodiment of the invention with the solenoid in its deenergized condition;

Fig. 5 shows a cross-sectional view of the solenoid of Fig. 4 in its energized condition;

Fig. 11 shows a fifth embodiment of the invention with the solenoid in its deenergized position;

Fig. 12 shows the solenoid of Fig. 11 in its energized condition; and

Fig. 13 shows a top view of the solenoid of Figs. 11 and 12.

Figure 6:
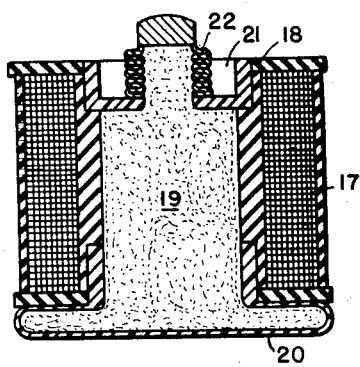
Fig. 6 shows a cross-sectional view of a third embodiment of the invention with the solenoid in its deenergized condition.

The embodiment of the invention illustrated in Figs. 1, 2 and 3 shows a fluid magnetic substance 1 sealed in a container to form a core member for a solenoid. The fluid magnetic substance may be of the dry type such as a medium of ferro-magnetic particles and flake graphite or a liquid medium such as finely divided iron particles in oils or silicone fluids. The container for the fluid magnetic substance is comprised of a cylindrical member 2 of non-magnetic material which forms the outer wall and a bellows 3 protruding at one end and a bellows 4 extending inwardly into the cylinder to form the opposite end of the container. The longitudinal axis of the container coincides with the longitudinal axis of the coil member 5. The solenoid has a coil 5 wound upon a spool 6, the leads of which are brought out at terminals 7 and 8.

Fig. 3 shows how an end plate 9 may be fitted over the top of the spool 16 and provided with mounting holes 10 and 11 for the purpose of mounting the solenoid in a desired position. Fig. 1 shows the solenoid with the coil 5 deenergized, and Fig. 2 shows the mass displacement of the fluid magnetic substance 1 when the coil is energized. This illustrates how the mass displacement of the fluid magnetic substance is moved upward to cause the upper bellows 3 to be extended farther and the lower bellows 4 to be extended farther inwardly, to translate the motion of the fluid magnetic substance 1. Thus it may be seen how the movement of the protruding bellows 3 may be used to actuate a desired mechanism such as a switch trip mechanism. The fluid volume is constant in this embodiment of the invention and no resultant force is imposed on the flexible bellows 3 and 4 by atmospheric pressure.

To improve the efficiency of the solenoid the coil can be enclosed in an iron circuit. Also auxiliary return springs can be used inside or outside of the core assembly to decrease the drop-out time when the coil is deenergized. The flexible bellows 3 and 4 which form the end members of the container for the fluid magnetic substance 1 may be made of a synthetic rubber or flexible plastic material, the particular substance being dependent upon the application of the solenoid. Where the solenoid is subject to a wide range of ambient temperature changes, silicone fluids can be used to maintain an almost constant viscosity in the magnetic fluid substance.

As all parts are sealed and can be made highly resistant to corrosion, solenoids of the type disclosed are used to particular advantage when it is necessary to have a solenoid submerged in liquids or gases.

The embodiment of the invention shown in Figs. 4 and 5 also have a coil 12 would on a spool 13. Since both Figs. 4 and 5 are cross-sectional, they only show one tap 14 where a coil lead is brought out. The core member for the solenoid as shown in Fig. 4 comprises the magnetic fluid substance 15 which is enclosed in a flexible "hour-glass" shaped container having convex ends. The container 16 may be shaped in such a manner and made flexible enough to be forced through the coil spool 13 so that the spool holds it into a position such that the longitudinal axis of the "hour-glass" shaped container coincides with the longitudinal axis of the coil member 12. The diagram of Fig. 5 illustrates how energization of the coil will force the magnetic material toward the center of the coil. The initially convex ends of the flexible container 16 will be pulled in and will have a concave shape as shown. This provides a double acting solenoid as there is movement at both ends.

Figure 7:
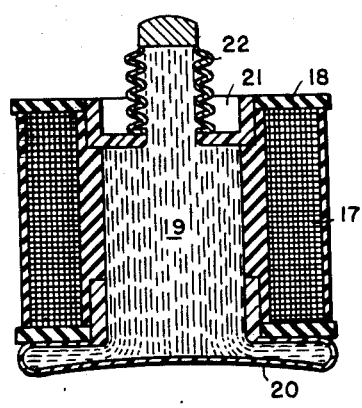
Fig. 7 shows a cross-sectional view of the solenoid of Fig. 6 in its energized condition.
Figure 8:
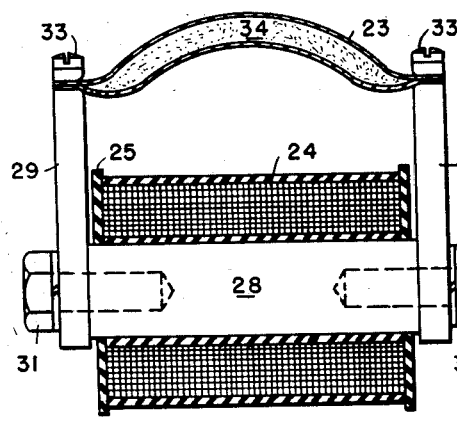
Fig. 8 shows a cross-sectional view of a fourth embodiment of the invention with the solenoid in its deenergized condition.
Figure 9:
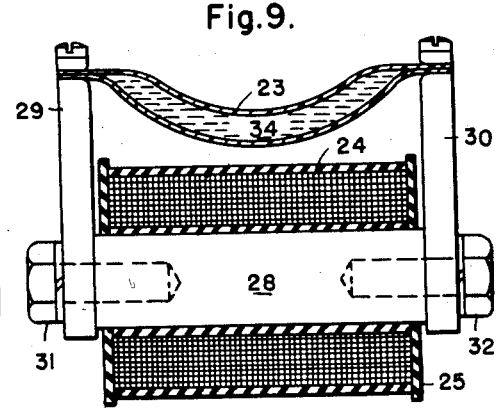
Fig. 9 shows a cross-sectional view of the solenoid of Fig. 8 in its energized condition.
Figure 10:
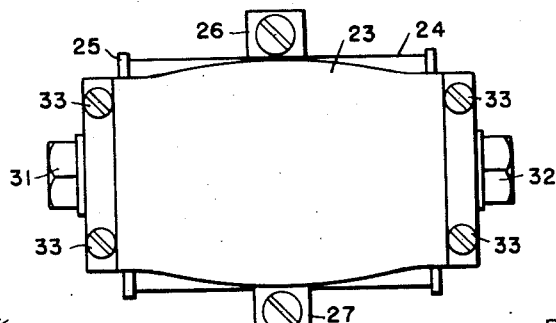
Fig. 10 shows a top view of the solenoid of Figs. 8 and 9.

Figs. 6 and 7 show a solenoid having a coil member

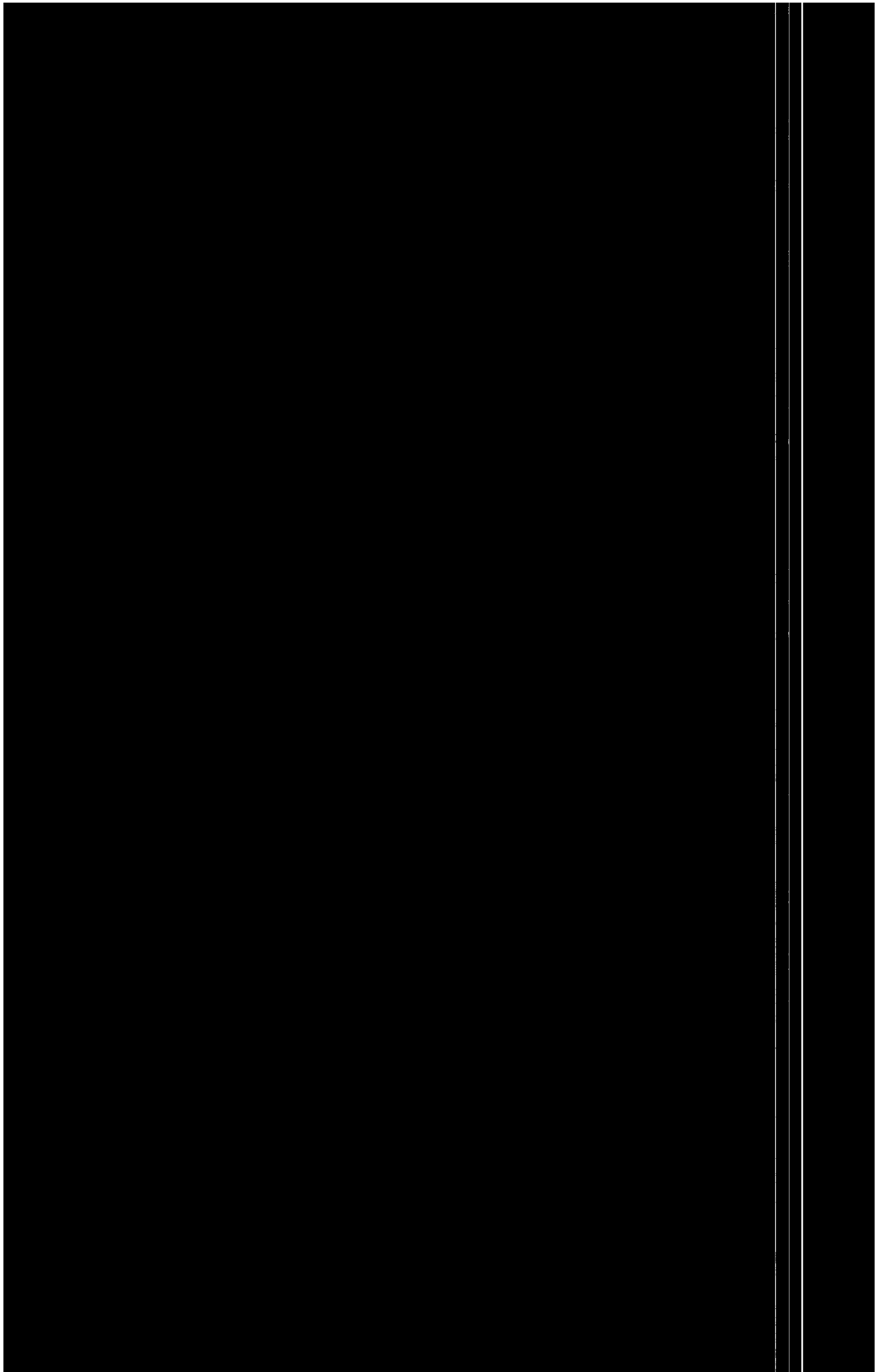

said coil means to change its mass displacement and cause the bellows to protrude farther.

5. A solenoid comprising, the combination of coil means adapted to be connected to a power source, a cylindrical shaped container within the coil means having a flexible bellows protruding from one end and a flexible cylinder of enlarged cross-section at the other end; and a fluid magnetic substance confined in said container said flexible bellows having a normally retracted configuration in which the mass distribution of said fluid magnetic substance in said container differs from that when said fluid magnetic substance is subjected to the magnetic field of said coil, said fluid magnetic substance being responsive to flux from said coil means to change its mass displacement and cause the bellows to extend farther.

6. An electro-magnetic actuator comprising, the combination of coil means adapted to be connected to a power source; a flexible container of substantially an "hour-glass" configuration within said coil means and having its longitudinal axis substantially coincident with the longitudinal axis of said coil means; the ends of said flexible container being convex; and a fluid magnetic substance confined in said flexible container to be responsive to flux from said coil means to change the configuration of said flexible container, said flexible container having a normal configuration in which the mass distribution of said fluid magnetic substance differs from the mass distribution thereof when subjected to the flux of said coil.

7. A solenoid comprising the combination of a coil means, a flexible container, container support means, and a fluid magnetic substance, said flexible container being substantially flat and being supported at its ends in flux exchange relationship with said coil means and such that it is normally bowed outwardly away from said coil means, said fluid magnetic substance being confined in said flexible container and having a mass distribution when said container is in said normal position which differs from that when said fluid magnetic substance is subjected to flux from said coil means to be responsive to flux from said coil means to cause said flexible container to bow inwardly toward said coil means.

8. A solenoid comprising the combination of a coil means; a magnetic core means having one leg surrounded by the coil means and an end leg at either end of said one leg to form three legs of a rectangle; a substantially flat flexible container having its ends supported by the free ends of the end legs of said magnetic core means in such a manner that it is bowed outwardly away from said coil means; and a magnetic fluid substance contained in said flexible container to form a substantially closed magnetic circuit with said core means, the mass distribution of said magnetic fluid substance when said container is in said normal position differing from that when said magnetic fluid substance is subjected to coil flux so as to be responsive to the flux from said coil means to cause the flexible container to bow inwardly toward said coil means.

9. A solenoid comprising the combination of a coil means, a substantially toroidal shaped flexible container adapted to surround said coil means in flux exchange relationship thereto, and a fluid magnetic substance confined within said flexible container, said container having a normal configuration in which the mass distribution of said fluid magnetic substance differs from that which exists when said fluid magnetic substance is subjected to flux from said coil means so as to be responsive to the flux from said coil means to alter the configuration of said flexible container.

10. A solenoid comprising the combination of a coil means; a magnetic core member surrounded by said coil means and having an individual disc of magnetic material fixed at each end of said core and having a great diameter than said coil means; a substantially toroidal shaped flexible container adapted to surround said coil member and be secured between said individual discs; and a fluid magnetic substance contained in said flexible container to form a substantially closed magnetic circuit with said core means and said individual discs, said container having a normal configuration in which the mass distribution of said fluid magnetic substance differs from that which exists when said fluid magnetic substance is subjected to flux from said coil means so as to be responsive to the flux from said coil means to alter the configuration of said flexible container.

11. An electro-magnetic actuator comprising, the combination of coil means adapted to be connected to a power source; a flexible container of substantially an "hour-glass" configuration within said coil means and having its longitudinal axis substantially coincident with the longitudinal axis of said coil means; the ends of said flexible container being convex; means connecting the ends of said container to the ends of said coil, and a fluid magnetic substance confined in said flexible container to be responsive to flux from said coil means to change the configuration of said flexible container, said flexible container having a normal configuration in which the mass distribution of said fluid magnetic substance differs from the mass distribution thereof when subjected to the flux of said coil.

References Cited in the file of this patent

UNITED STATES PATENTS

| | | |
|---|---|---|
| 2,532,876 | Asche | Dec. 5, 1950 |
| 2,587,482 | Keller | Feb. 26, 1952 |
| 2,500,953 | Lidman | Mar. 21, 1953 |
| 2,660,640 | Wolf | Nov. 24, 1953 |